_____

United States Patent [19]
Stoutjesdijk

[11] Patent Number: 6,132,207
[45] Date of Patent: Oct. 17, 2000

[54] DISCHARGE SYSTEM FOR A REACTOR, AND PROCESS SYSTEM PROVIDED WITH A DISCHARGE SYSTEM OF THIS KIND

[75] Inventor: Jeroen Jan Stoutjesdijk, Bussum, Netherlands

[73] Assignee: ASM International N.V., Bilthoven, Netherlands

[21] Appl. No.: 09/202,227

[22] PCT Filed: Apr. 9, 1998

[86] PCT No.: PCT/NL98/00204

§ 371 Date: Dec. 9, 1998

§ 102(e) Date: Dec. 9, 1998

[87] PCT Pub. No.: WO98/46345

PCT Pub. Date: Oct. 22, 1998

[30]     Foreign Application Priority Data

Apr. 11, 1997  [NL]  Netherlands ........................... 1005802

[51] Int. Cl.[7] .................................................... F27B 5/04
[52] U.S. Cl. .......................................... 432/205; 432/67
[58] Field of Search .............................. 432/67, 100, 113, 432/145, 152, 200, 205, 245, 263, 239, 241

[56]     References Cited

U.S. PATENT DOCUMENTS

| 4,502,503 | 3/1985  | Karpenko ........................... 137/527.8 |
| 4,620,508 | 11/1986 | Fligner et al. ......................... 122/7 R |
| 5,738,511 | 4/1998  | Borah et al. ........................... 432/100 |
| 5,769,628 | 6/1998  | Lin .......................................... 432/67 |

*Primary Examiner*—Denise L. Ferensic
*Assistant Examiner*—Gregory A. Wilson
*Attorney, Agent, or Firm*—Knobbe, Martens, Olson & Bear, LLP

[57]     ABSTRACT

Discharge system for a reactor, such as a furnace. The discharge system comprises a collection duct, to which a number of discharge lines are connected, each discharge line in turn being coupled to an installation, such as a furnace. In order to keep the reduced pressure at the location of a furnace of this nature as constant as possible, it is proposed to provide a valve at the location of the reactor, which valve adjusts an opening between the discharge line and atmosphere in a controllable manner. In this way, a controlled reduced pressure can be maintained at the location of the valve, i.e. at the outlet from the reactor.

9 Claims, 3 Drawing Sheets

DISCHARGE SYSTEM FOR A REACTOR, AND PROCESS SYSTEM PROVIDED WITH A DISCHARGE SYSTEM OF THIS KIND

FIELD OF THE INVENTION

The present invention relates to a discharge system for a reactor in accordance with the preamble of claim 1.

BACKGROUND OF THE INVENTION

Such a system is known from U.S. Pat. No. 4,863,374. In the semiconductor industry, and also in other processes in which a very small quantity of gas or other medium is metered into a reactor in order to allow the process in question to proceed, it is frequently important for the reduced pressure on the discharge side to be kept accurately constant. If such a reduced pressure varies excessively, the result is that the flow rate and residence time of the medium in question through the reactor varies, and consequently the end product is adversely affected. This applies in particular if the discharge system for a reactor of this kind is combined with the discharge system of other reactors. Changes in the process conditions in those other reactors could have an adverse effect on the process conditions in the first reactor. This applies in particular if the discharge system is provided with a central suction device, such as a fan, and in the event of the flow rate through one reactor increasing or falling, the flow rate in another reactor will be reduced or increased, respectively.

A number of proposals have been made in the prior art in order to avoid this problem.

A first proposal comprises arranging a butterfly valve in the connection between the outlet from the reactor and the discharge line. This butterfly valve is set manually to a fixed value.

According to another proposal, a butterfly valve of this kind was likewise used in the connection between discharge line and outlet, but this valve can be controlled during the process. To do this, it is necessary to use a complicated pressure gauge and to convert the signal which it measures into a movement of the valve, using electric, hydraulic or pneumatic means. A solution of this kind is particularly expensive if there are a number of discharge lines and restrictor devices of this kind present. Moreover, there are considerable adjustment problems and it is not readily possible to fix the pressure to an absolute value.

Moreover, it is necessary when using certain toxic gases to make the latter less hazardous before they are released into the free atmosphere. This can be achieved by the provision of expensive absorbing agents. Another proposal which is known in the prior art is the admixture of air or other gases from the atmosphere, with the result that the concentration of hazardous products of this kind is reduced. To this end, a separate air-metering device is proposed, the supply of air preferably taking place downstream of the suction device, in order not to interfere unnecessarily with operation of the discharge system.

It is proposed in U.S. Pat. No. 4,863,374 to arrange an electrically operated valve in the discharge line to the discharge duct. This valve functions to suck in cold air, in order for this to be admixed to the gases emanating from a furnace. In order to protect the discharge system against excessively high temperatures, the supply of cold ambient air to the outlet is controlled as a function of the temperature in the furnace. There is no mention of controlling the pressure prevailing in the furnace, and in view of the aim of the furnace, namely to heat ceramic objects, this also does not appear to be important.

SUMMARY OF THE INVENTION

The object of the present invention is to avoid these drawbacks and to provide a simple discharge system for controlling the reduced pressure in the region of the outlet from a reactor which can be adjusted in a simple manner. Moreover, it is intended to provide a discharge system with which it is possible in a simple manner to admix a further gas from the atmosphere into the discharge stream.

This object is achieved with a discharge system for a reactor, having a gas discharge line and a valve. The gas discharge line has a first end configured to be connected to a discharge of the reactor and a second end configured to be connected to a discharge duct in which a device is arranged which generates a reduced pressure in the discharge duct. The valve is positioned within an opening of the discharge line. The opening provides a gas input. The valve is responsive to a pressure difference between the gas input and the reduced pressure so that at the opening the reduced pressure does not exceed a predetermined value.

The invention is based on the insight of using a suction device with a capacity which is sufficient to generate the required reduced pressure for all the reactors or other devices which are connected to the discharge system. This suction device is then allowed to function under optimum operating conditions, and the surplus flow rate is constantly adjusted by admitting a larger or smaller volume of air with the aid of the valve according to the invention, which is situated in the region of the connection between discharge line and outlet from the reactor. By sucking in air from the atmosphere, the concentration of hazardous substances is reduced to an acceptable level immediately next to the outlet from the reactor. Admixing air reduces the partial pressure of discharged gases. This counteracts condensation of steam and other vapours. Changes in process conditions in a reactor are instantly compensated for by changing the position of the valve.

A valve of this kind may comprise any design which is known in the prior art, such as a spring-loaded, electrically, hydraulically or pneumatically actuated valve.

According to a particularly simple embodiment of the invention, the valve comprises a weight-loaded valve. By adapting the weight to the surface area of the valve, it is possible to provide a particularly accurate control of the reduced pressure at that location. Preferably, a weight-loaded valve of this kind is a flap valve. A flap valve of this kind can be accommodated in a valve casing, which valve casing on the one hand forms part of the discharge line, or a branch line thereof, and on the other hand is provided with an opening which opens out into the free atmosphere. In this case, the actual valve interacts with an annular rim of the opening which functions as a valve seat. To provide adjustment of optimum accuracy, it is preferred for the hinge of the valve, in the position of use, to lie at least at a higher level than part of the valve seat.

The valve according to the invention makes it particularly easy to provide a non-return function. This means that if, for whatever reason, excess pressure should occur at any location in the discharge system, the valve will close, thus preventing toxic gases from being blown back through the valve opening to the location where the reactor in question is disposed.

The invention allows the control mechanism for the valve and the valve itself to be combined in a single mechanical unit, so that there is no need for any feedback to atmosphere via complex systems and it is always ensured that the pressure in the discharge line, and hence the pressure in the furnace in question, are optimized.

The invention also relates to a process system comprising a reactor which operates using a gas which is hazardous to health, which reactor is connected to the above-described discharge system. Examples of gases which are hazardous to health which may be mentioned here are HCl gases and $PH_3$. Other gases which can be discharged using the discharge system according to the invention are oxidation products, TCA, $H_2$, $O_2$ and water vapour. It should be understood that the above is merely a limited summary of the different options.

BRIEF DESCRIPTION OF THE DRAWINGS

The invention will be explained in more detail below with reference to exemplary embodiments depicted in the drawing, in which.

DETAILED DESCRIPTION OF THE INVENTION

Figure 1:
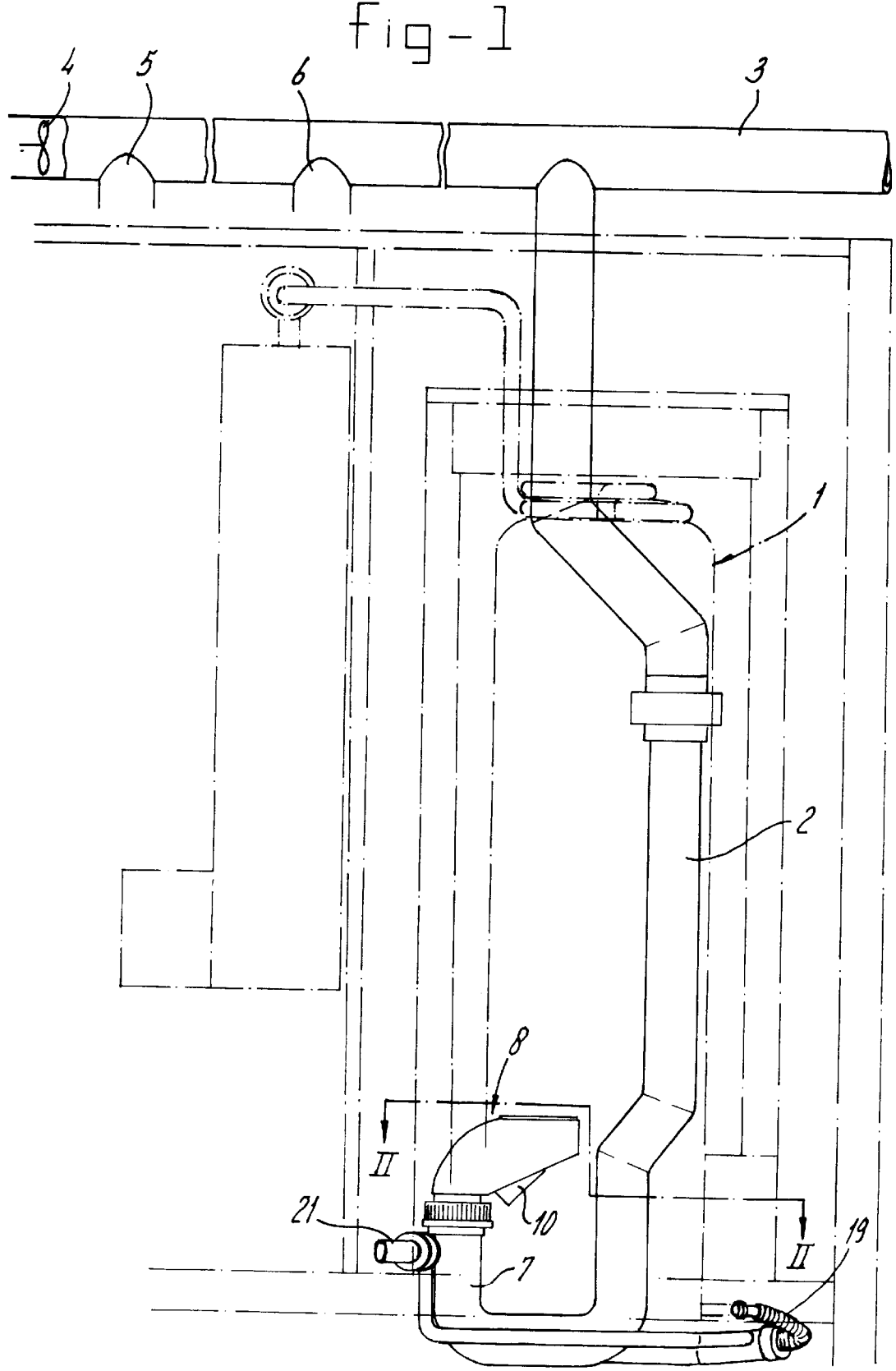
FIG. 1 shows a diagrammatic side view of the discharge system according to the invention in combination with a reactor.
Figure 2:
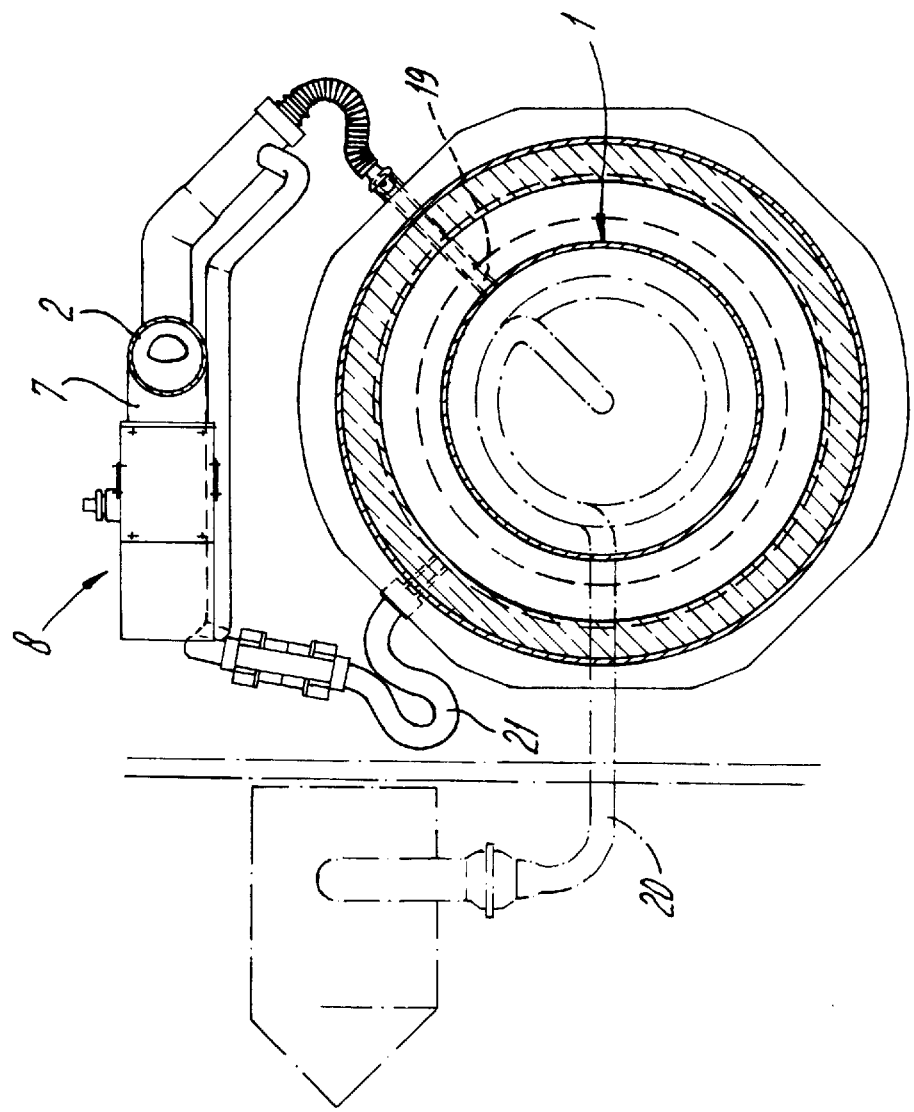
FIG. 2 is a sectional view on line II and II of FIG. 1.

In FIG. 1, 1 denotes a furnace. The invention will be discussed on the basis of such a furnace, but it should be understood that any other installation can be combined with the discharge system according to the invention. In the present example, the furnace is a device in which wafers are treated by flowing a process gas past them. For certain applications, particularly low concentrations of a gas to be metered are required, and it is of the utmost importance that there is an extremely uniform concentration of this low metered quantity through the entire reactor, in order to obtain a uniform process. Gas is supplied via line 20 and moves through the furnace with a constant residence time. To this end, it is important that the reduced pressure at the location of the outlet 19 from the furnace is constant during the process. This outlet 19 from the furnace is connected to a discharge duct 3 via a discharge line 2. In this case, discharge duct 3 is provided with a suction device 4, such as a fan, which will in general be arranged on the roof of the respective building or the like. As well as discharge line 2, discharge lines 5 and 6 are also present, leading to reactors or other suction points which are not shown in more detail. Discharge line 2 is provided with a branch line 7, on which a valve 8 is arranged. 21 denotes a discharge for nitrogen which is used for cooling and separation. Details of the valve 8 will emerge from FIGS. 3 and 4.

Figure 3:
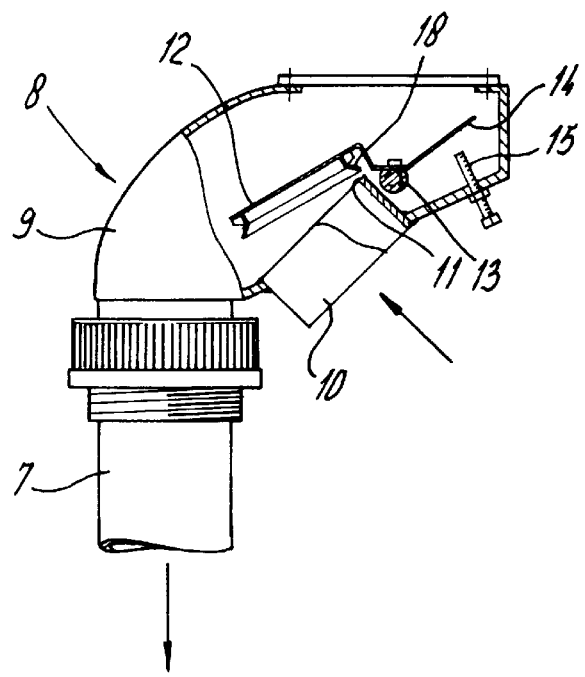
FIG. 3 shows a detailed, partial section through the valve according to the invention.
Figure 4:
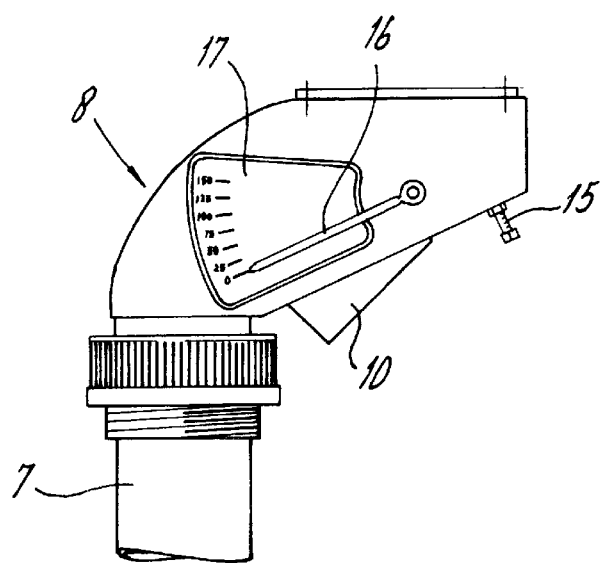
FIG. 4 shows a side view of the valve according to the invention.

In FIGS. 3 and 4, the valve casing of this valve 8 is denoted by 9. On the one hand, this valve casing 9 is connected to branch line 7, and on the other hand it is provided with an air inlet opening 10. The passage of air through this opening 10 is controlled by adjusting a valve 12, which can bear against a valve seat 11. Valve 12 comprises a disc-like body which is pivotably attached, via valve hinge 13, to a counterweight 14. Travel of valve 12 is limited by a stop screw 15. The valve body is provided with a V-seal 18 which acts on valve seat 11.

As can be seen from FIG. 4, hinge pin 13 extends through the casing on at least one side and has attached to it a pointer 16 which interacts with a scale 17 positioned on valve casing 9. The position of the valve 12 accurately indicates the flow rate of air which is passing through opening 10.

During normal operation, the suction device 4 will be overdimensioned, i.e. without the presence of valve 8 the reduced pressure at the location of outlet 19 from furnace 1 would be excessive. However, the extent of a reduced pressure of this nature is reduced to the desired level owing to the presence of valve 8. Depending on the setting of the weight, the valve body 12 will be further or less far away from seat 11 and more or less air will be admitted. If exceptional circumstances cause a decline in the reduced pressure, i.e., for example, one of the other discharge lines 5 or 6 emits more gas, valve 12 will move in the closure direction. In the opposite case, valve 12 will open. If an irregularity in production causes excess pressure within the system, valve 12 will close completely, thus preventing gas which is hazardous to health passing into the atmosphere via opening 10.

Owing to the use of valve 8, under normal operating conditions air is admixed directly at the location of the outlet 19. This is particularly desirable in the event that gases which are hazardous to health and/or condensing gases are to be discharged. Admixing air will reduce the concentration of such gases, with the result that the required standard can be achieved.

As an example, a valve according to the invention can be used for a flow rate which lies between 20 and 80 $m^3$ air/hour at a reduced pressure of approximately ½ inch water column.

It has been found that arranging valve body 12 at an angle with respect to the inlet of valve casing 9 provides for flow of optimum stability, with the result that it is not necessary to provide special damping means for valve body 12. The above effect is also promoted by positioning hinge 13 below the upper rim of valve seat 11.

Although the invention is described above with reference to a preferred embodiment, it should be understood that it can be modified in numerous ways without departing from the scope of the present application. For example, it is possible to use the discharge system according to the invention in other reactors or installations which are operated using other gases or media. This and other changes are all considered to lie within the scope of the appended claims.

What is claimed is:

1. A discharge system for a reactor, comprising:
    a gas discharge line having a first end configured to be connected to a discharge of the reactor and a second end configured to be connected to a discharge duct in which a device is arranged which generates a reduced pressure in the discharge duct,
    a branch line having one end open to said discharge line between said first and second ends, said branch line having a second end to provide a gas input to the branch line and into the discharge line, and
    a valve within the branch line, said valve being responsive to a pressure difference between the gas input and the reduced pressure so that at the open end of the branch line the reduced pressure does not exceed a predetermined value.

2. The system of claim 1, wherein the gas input is the atmosphere.

3. The system of claim 1, wherein the valve is loaded by a weight.

4. The system of claim 1, wherein the valve includes a flap valve.

5. The system of claim 1, including a valve casing having an interior connected to the discharge line, the casing having an annular rim delimiting the opening and functioning as a valve seat.

6. The system of claim 5, wherein the valve includes a valve body which cooperates with the valve seat, the valve body having a hinge axis which, in a position of use, lies at a lower level than a part of the valve seat.

7. The system of claim 1, wherein the valve is configured to prevent flow out of the discharge line through the valve.

8. A process system, comprising:

a reactor configured to treat wafers by flowing a process gas past them, the reactor having a discharge connectable to a discharge duct in which a device is arranged to generate a reduced pressure in the discharge duct; and a discharge system for the reactor comprising:

a discharge line having a first end connected to the discharge of the reactor and a second end connectable to the discharge duct, a branch line having one end open to said discharge line between said first and second ends, said branch line having a second end to provide a gas input to the branch line and into the discharge line, and a valve located within the branch line, the valve being responsive to a pressure difference between the gas input and the reduced pressure within the discharge line so that at the open end of the branch line the reduced pressure does not exceed a predetermined value.

9. The process system according to claim 8, including various discharge lines connected to the discharge duct.

* * * * *